US006360321B1

(12) United States Patent
Gressel et al.

(10) Patent No.: US 6,360,321 B1
(45) Date of Patent: Mar. 19, 2002

(54) SECURE COMPUTER SYSTEM

(75) Inventors: Carmi David Gressel, Kvutzat Urim; Ran Granot, Yavne, both of (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 0 days.

(21) Appl. No.: 08/930,755

(22) PCT Filed: Feb. 4, 1997

(86) PCT No.: PCT/IL97/00044

§ 371 Date: Nov. 12, 1999

§ 102(e) Date: Nov. 12, 1999

(87) PCT Pub. No.: WO97/29567

PCT Pub. Date: Aug. 14, 1997

(30) Foreign Application Priority Data

Feb. 8, 1996 (IL) .................................................. 117085

(51) Int. Cl.[7] ................................................. H04L 9/00
(52) U.S. Cl. ........................ 713/172; 713/175; 713/176; 713/180; 713/194; 380/29; 380/30; 380/52; 380/259
(58) Field of Search ................................. 713/176, 180, 713/189, 175, 172, 192, 194; 380/259, 52, 29, 30

(56) References Cited

U.S. PATENT DOCUMENTS

| 5,200,999 A | | 4/1993 | Matyas et al. |
| 5,265,164 A | | 11/1993 | Matyas et al. |
| 5,513,133 A | | 4/1996 | Gressel et al. |
| 5,535,276 A | | 7/1996 | Ganesan |
| 5,546,463 A | | 8/1996 | Caputo et al. |
| 5,655,090 A | * | 8/1997 | Weingart ............... 395/800.25 |
| 5,664,017 A | | 9/1997 | Gressel et al. |
| 5,787,174 A | * | 7/1998 | Tuttle ........................ 380/23 |
| 5,949,881 A | * | 9/1999 | Davis ........................ 380/25 |

FOREIGN PATENT DOCUMENTS

| EP | 0 893 751 A | * | 1/1999 | ............. G06F/1/00 |
| WO | 96/00953 | * | 1/1996 | .......... G06K/19/07 |

OTHER PUBLICATIONS

D.E. Denning and M. Smid "Key Escrowing Today", IEEE Communication Magazine Sep. 1994, pp. 58–68.
C. Gressel, R. Granot and I Dror, "International Cryptographic Communication UT Key Escrow", International Cryptographic Institute 95, Washington D.C., Sep. 22, 1995.
R.A. Rivest, A. Shamir, and I. Adelman, "A Method for Obtaining Digital Signatures and Public–Key Cryptosystems", Communications Of The ACM vol. 21, #2, Feb. 1978, pp. 120–126.

* cited by examiner

*Primary Examiner*—Albert Decady
*Assistant Examiner*—Paul E. Callahan
(74) *Attorney, Agent, or Firm*—Sidley Austin Brown & Wood, LLP

(57) ABSTRACT

A secure computer system including a host computer unit having embedded in a single package, a host CPU, and an authenticating and security controlling computer, a verification unit and a smart card accepting connector providing a public-key protected communication channel between the authenticating and security controlling computer and the verification unit, in a first mode of operation of the secure computer system, and between the host CPU, via the authenticating and security controlling computer, and a smart card, via smart cord terminal, in a second mode of operation of the secure computer system, wherein communication between the authenticating and security controlling computer and the smart card terminal is unmediated, and wherein the verification unit is operative to verify the identity of the authenticating and security controlling computer in the first mode of operation.

3 Claims, 8 Drawing Sheets

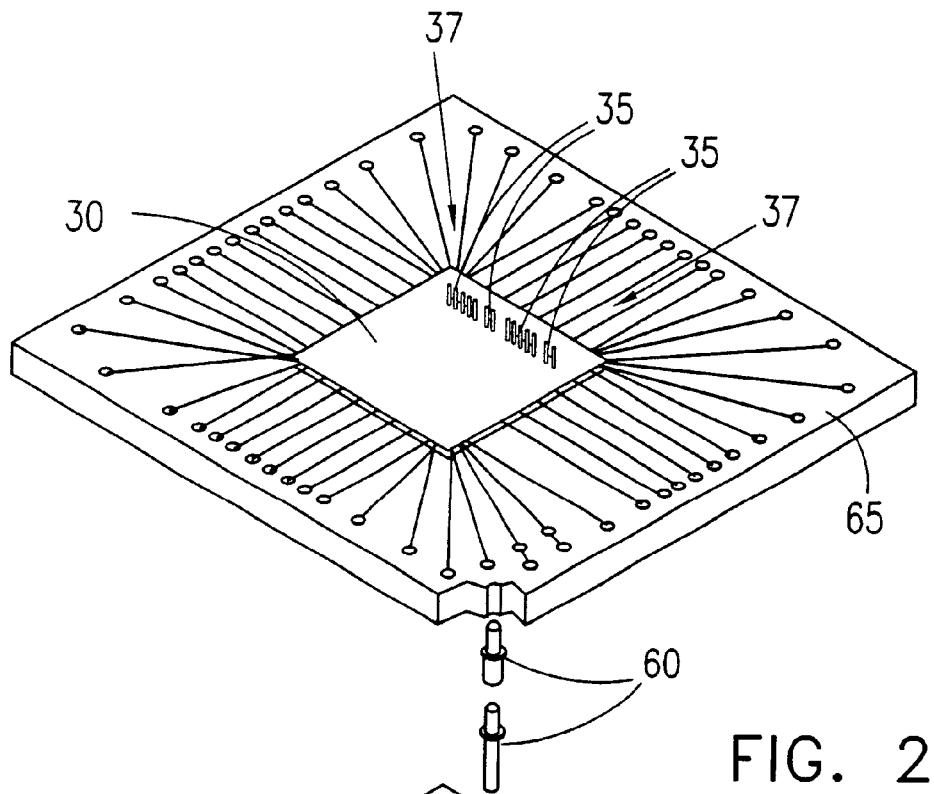
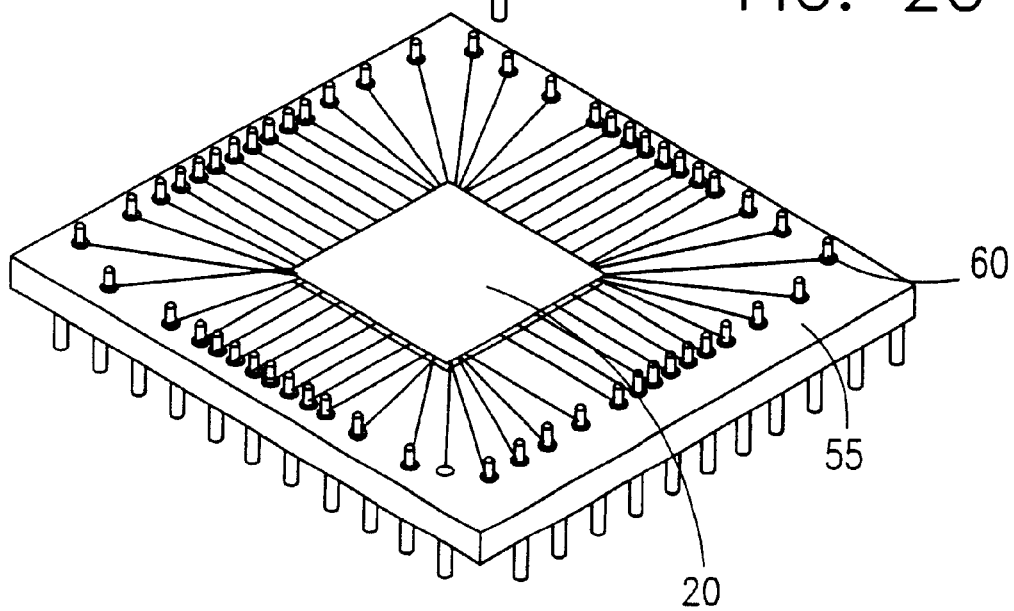
FIG. 2C

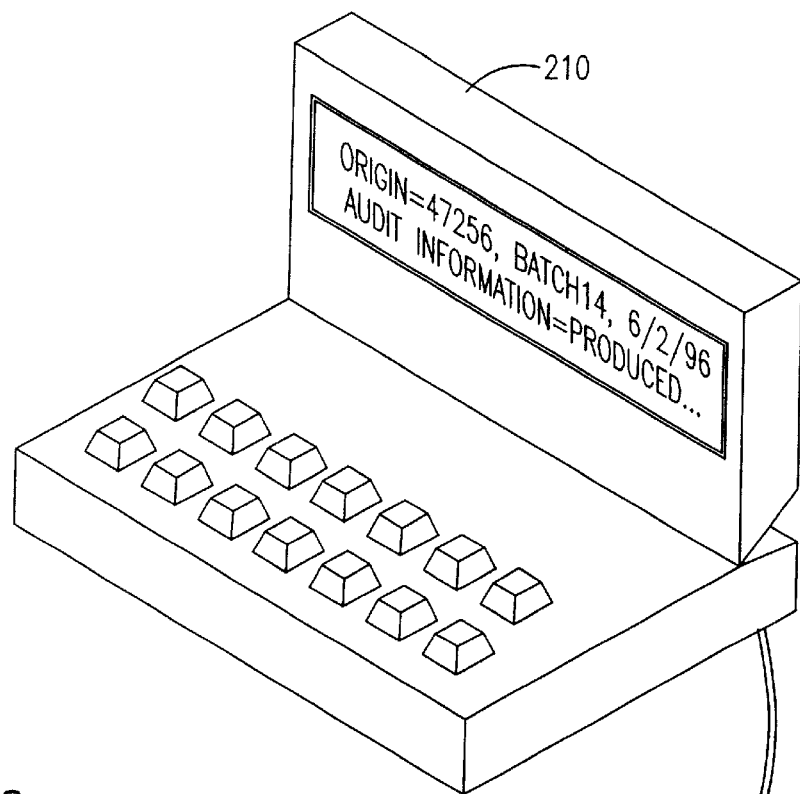
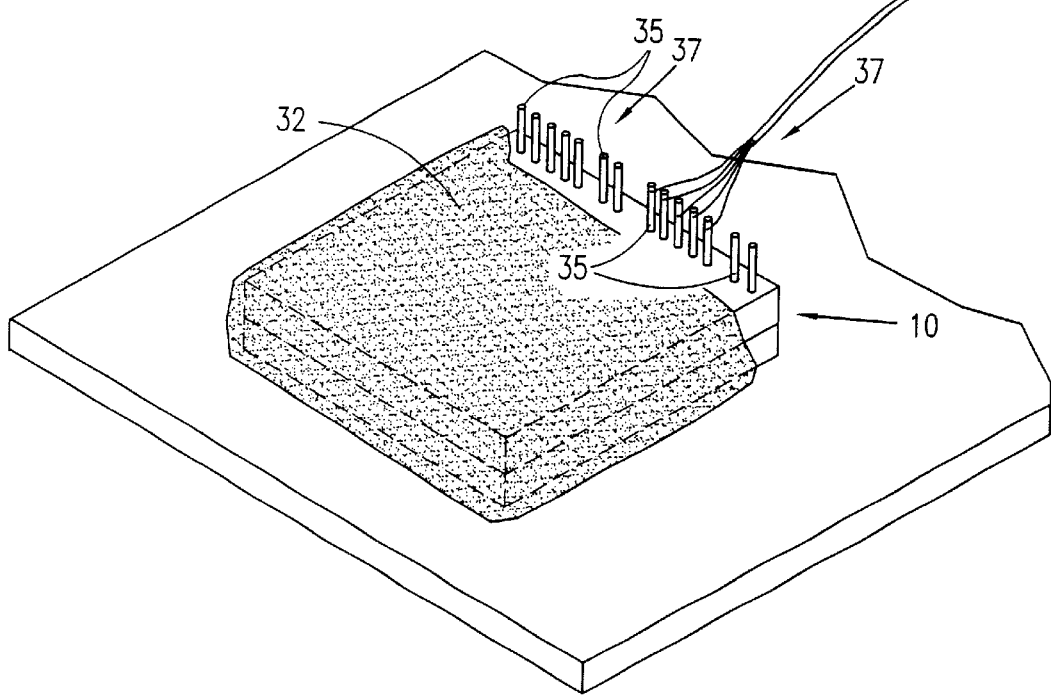
FIG. 6

SECURE COMPUTER SYSTEM

This application is a 371 of International Application PCT/IL/00044 filed Feb. 4, 1997.

FILED OF THE INVENTION

The present invention relates to secure computer system in general.

BACKGROUND OF THE INVENTION

The need for a secure computer system is well known. The need for secure computer systems falls into several categories. The need for secure capabilities which enable a computer to work in a secure environment, such as an electronic mail, remote banking, Internet, secure communications, telefax, or smart card environment is well known and falls into a first category of need. In a second category of need, it is well known that expensive computer CPU chips are often subject to theft. Unfortunately, individual expensive CPU chips can not easily be identified, and hence the recovery of stolen CPU chips is difficult. There is therefore a need to protect expensive CPU chips.

Methods and apparatus useful in secure computing are described in the following patent applications, commonly owned with the present application, the disclosures of which are hereby incorporated herein by reference:

Israel patent applications 113375 and 115534; and

U.S. patent applications 08/154220 and 08/437,223.

Methods and apparatus useful in secure computing are described in the following publications:

D. E. Denning and M. Smid, "Key escrowing today", IEEE Communication Magazine, September 1994, pp. 58–68;

C. Gressel, R. Granot, and I. Dror, "International Cryptographic Communications Without Key Escrow", International Cryptographic Institute '95, Washington D.C., Sep. 22, 1995;

R. L. Rivest, A. Shamir, and L. Adleman, "A method for obtaining digital signatures and public-key cryptosystems", Communications of the ACM Vol. 21 #2, February 1978, pp. 120–126;

DES Modes of Operation, FIPS PUB 81, National Bureau of Standards, US Department of Commerce, Washington, D.C., 1981;

MC68HC05SC49, 8-bit microcomputer with EEPROM and N modulo M exponent coprocessor product preview, Motorola semiconductor technical data, Schaumburg Ill., 1993;

MC68HC05SC30, Enhanced 8-bit microcomputer with EEPROM and N modulo M exponent coprocessor product preview, Motorola semiconductor technical data, Schaumburg, Ill., 1993;

ST16×F74 CMOS crypto-computer family ST16×F74, SGS-Thomson Microelectronics, Agrate, Italy, October 1993;

ST16CF54 CMOS MCU based safeguarded smartcard IC with modular arithmetic processor, SGS-Thompson Microelectronics, Agrate, Italy, September 1994; and Cryptoprocessor chip includes embedded cryptolibrary, SGS-Thompson Microelectronics, Agrate, Italy, press release K491M, October 1994.

The disclosure of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide an improved secure computer system. In the present invention, an authenticator computer is embedded in the same package with a host CPU. The embedded authenticator computer may provide secure capabilities such as those described above. The embedded authenticator computer may also provide identifying information including proof of identity. The identifying information may aid in preventing theft of the computer system and/or may aid in identification of a stolen computer system. Because the authenticator computer is embedded in the same package with the host CPU, removing the authenticator computer in order to circumvent the anti-theft capabilities thereof will generally be very difficult and/or too expensive to attempt.

There is thus provided in accordance with a preferred embodiment of the present invention a secure computer including a host CPU and an authenticator computer, wherein both the host CPU and the authenticator computer are embedded in a single package. The authenticator computer may have an identity and, and the authenticator computer may provide proof of the identity upon receiving an external signal from a verifying device. The proof of the identity may include origin information and/or an audit trail.

The secure computer may also include a smart card receiver, which may comprise a reader/writer card, including at least one smart card acceptor socket, each smart card acceptor socket being adapted to receive a smart card, wherein the authenticator verifies the smart card. The at least one smart card acceptor socket may include a plurality of smart card acceptor sockets.

The authenticator may control access to a controlled device. The authenticator provides data protection, including data encryption and/or data decryption. The data protection may include providing and/or verifying a digital signature.

The authenticator may protect data transmission between the secure computer and a remote device, optionally using approved protocols for transnational encryption, as well as approved protocols for authentication origin and contents of documents using an electronic signature.

There is also provided in accordance with another preferred embodiment of the present invention a method for securing a host computer, the method including providing a host CPU, providing an authenticator computer, and embedding both the host CPU and the authenticator computer in a single package.

BRIEF DESCRIPTION OF THE DRAWINGS

The present invention will be understood and appreciated from the following detailed description taken in conjunction with the drawings in which:

FIGS. 2A–2C are simplified pictorial illustrations of alternative preferred embodiments of the system of FIG. 1, comprising alternative embodiments thereof for different packaging methods;

FIG. 6 is a simplified pictorial illustration of a still further alternative preferred embodiment of the present invention.

DETAILED DESCRIPTION OF PREFERRED EMBODIMENTS

Figure 1:
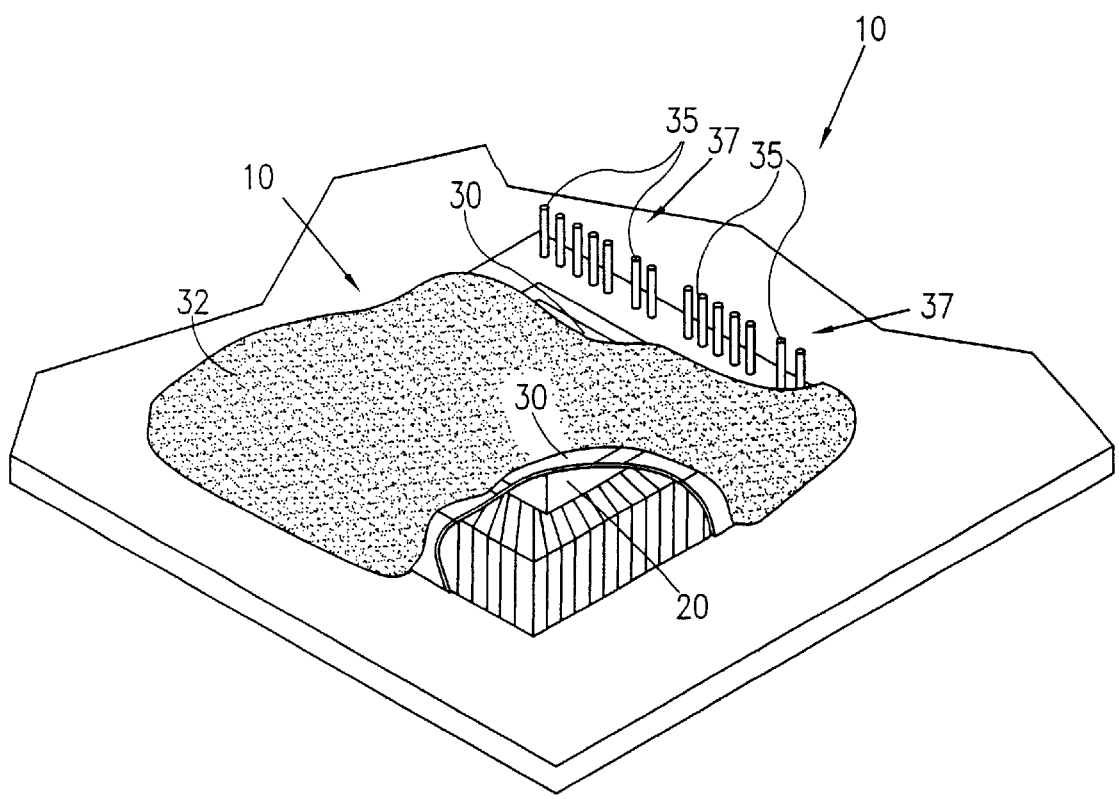
FIG. 1 is a simplified pictorial illustration of a secure computer system constructed and operative in accordance with a preferred embodiment of the present invention.

Reference is now made to FIG. 1 which is a simplified pictorial illustration of a secure computer system 10 constructed and operative in accordance with a preferred embodiment of the present invention. The secure computer system 10 comprises an authenticator computer 20. The authenticator computer 20 may be any appropriate authenticator computer, such as a cryptocomputer chip or a computer chip designed to rapidly process modular arithmetic operations useful for performing authentication, encryption, and decryption, as it well known in the art. Preferably, the authenticator computer 20 may be a model ST16CF54 available from SGS-Thompson. The authenticator computer 20 may alternatively be a MC68HC05SC49 8-bit microcomputer, commercially available from Motorola, Schaumburg Ill., USA.

The authenticator computer 20 is embedded in a single package with a host CPU 30. The host CPU 30 may be any appropriate CPU. It is appreciated that the present invention, by providing anti-theft capabilities, is particularly useful in the case where the host CPU 30 is an expensive CPU.

Preferably, in order to provide optimal anti-theft capabilities, the embedding, of the authenticator computer 20 and the host CPU 30 into a single package comprises permanently bonding together the authenticator computer 20 and the host CPU 30. The system of FIG. 1 also comprises an electrically insulating thermally conducting layer 32, covering the authenticator computer 20 and the host CPU 30. The electrically insulating thermally conducting layer 32 may comprise ceramic or any other suitable electrically insulating thermally conducting material. It is appreciated that alternative and/or additional methods of bonding the authenticator computer 20 and the host CPU 30 may be used, such as, for example, providing a bonding layer (not shown) between the authenticator computer 20 and the host CPU 30.

The system of FIG. 1 also comprises an external connection 35. The external connection 35 shown in FIG. 1 is arranged, by way of example only, into two smart card reader connectors 37. The external connection 35, which typically comprises a plurality of pins, is operative to provide an electrical connection between the authenticator computer and external devices such as one or more smart card readers. The external connection 35 may also be operative to provide an electrical connection to an external device comprising a verification device, as described below with reference to FIG. 6.

The term "smart card reader", as used throughout the present specification and claims, refers to any smart card device, as is well known in the art, or to any device using similar technology to provide authentication and/or transaction security. It is appreciated that a smart card device may accept a card, a key, a button, or any portable security identification item. The card, key, button, or any portable security identification item is referred to throughout the present specification and claims as a "smart card". Typically, a smart card device, as is well known in the art, comprises an imbedded processor and/or memory unit which are operative to provide the authentication and/or transaction security.

Figure 2A:
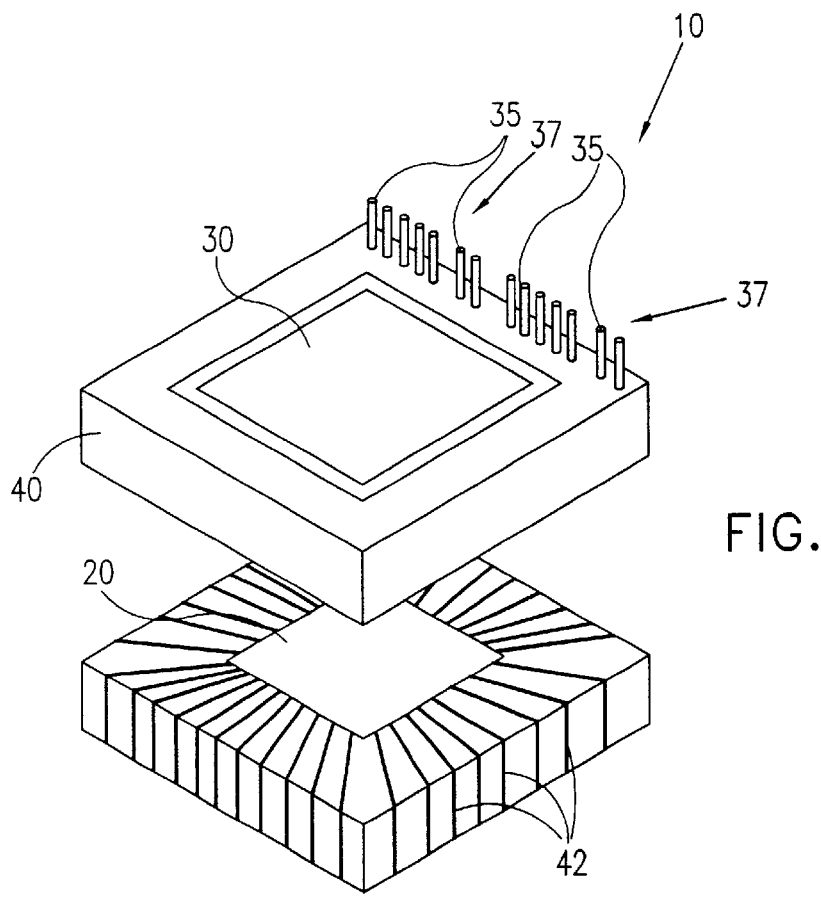
Figure 2B:
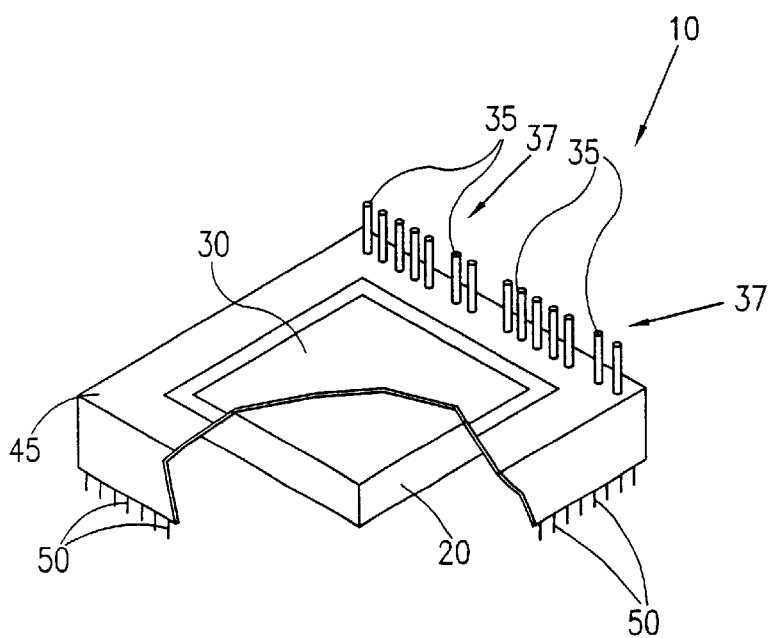

Reference is now additionally made to FIGS. 2A–2C, which are simplified pictorial illustrations of alternative preferred embodiments of the system of FIG. 1, comprising alternative embodiments thereof for difference packaging methods. The packaging methods of FIGS. 2A–2C are believed to simplify the interface between the secure computer system 10 and a computer in which the secure computer system 10 is located, particularly by not occupying additional motherboard space or requiring changes to the motherboard.

FIG. 2A is an exploded view of the secure computer system 10 of FIG. 1, packaged using a lead frame packaging method. The system of FIG. 2A also comprises an adaptor 40, which is operative to connect to a plurality of conductors 42 formed on the surface of the host CPU 30. The authenticator computer 20 is in turn operatively connected to the adaptor 40. The host CPU 30 is typically positioned on top of the adaptor 40, with the adaptor 40 being positioned on top of the authenticator computer 20; this arrangement is deemed preferable in order to allow sufficient thermal conductance of the host CPU 30. It is appreciated that other physical arrangements of the authenticator computer 20, the host CPU 30, and the adaptor 40 are also possible. The adaptor 40 is operative to provide an electrical connection between the host CPU 30 and the authenticator computer 20, and also to provide an electrical connection via the eternal connection 35 to external devices, as explained above.

FIG. 2B is a simplified pictorial illustration of the secure computer system 10 of FIG. 1, packaged using a socketed packaging method. The packaging method of FIG. 2B is believed to be particularly useful when adding the authenticator computer 20 to an existing computer system. The system of FIG. 2B comprises an adaptor 45. The adaptor 45 comprises a plurality of conductor pins 50, designed to fit within an existing acceptor socket adapted to receive the host CPU 30. The adaptor 45 also comprises an external connector 35, as described above.

The adaptor 45 is adapted to receive the authenticator computer 20, typically inside the adaptor 45. The adaptor 45 is also adapted to receive the host computer 30, typically on top of the adaptor 45. The adaptor 45 is operative to provide an electrical connection between the host CPU 30 and the authenticator computer 20, and also to provide an electrical connection via the external connection 35 to eternal devices, as explained above.

FIG. 2C is an exploded view of the secure computer system 10 of FIG. 1, packaged using a pin grid array packaging method. The system of FIG. 2C comprises a pin grid board 55, comprising a plurality of pins 60. At least some of the plurality of pins 60 extend upward above the pin grid board 55, allowing connection to an authenticator printed circuit board (PC board) 65. The host CPU 30 is mounted to the PC board 65, typically on upper side thereof, so that a plurality of pins (not shown) on the underside of the host CPU 30 extend through holes in the PC board 65 and make electrical contact with the plurality of pins 60. The authenticator computer 20 is mounted on the pin grid board 55, typically on the upper side thereof. The PC board 65 is operative to provide an electrical connection between the host CPU 30 and the authenticator computer 20, and also to provide an electrical connection via the external connection 35 to external devices, as explained above.

It is appreciated that the embodiments of FIGS. 2A–2C are provided by way of example only, and that a wide variety of packaging methods may be used in packaging the secure computer system 10 of FIG. 1.

The operation of the system of FIG. 1 is now briefly described. The secure computer system 10 may receive a request to be processed from an external device through the external connection 35 and operate thereon. Requests may also be processed internally; that is, a request may be initiated by the host CPU 30 and may then be processed by the authenticator computer 20. In the case of either an external or an internal request, the output of processing the request by the authenticator computer 20 may be provided either through the external connection 35 or to the host CPU 30, which typically further processes the output. Typically, a request comprises a request to perform one of the following: a digital signature operation; a data transmission protection operation; a data protection operation; an access control operation; a smart card verification operation; or and proof of identity operation.

Figure 3:
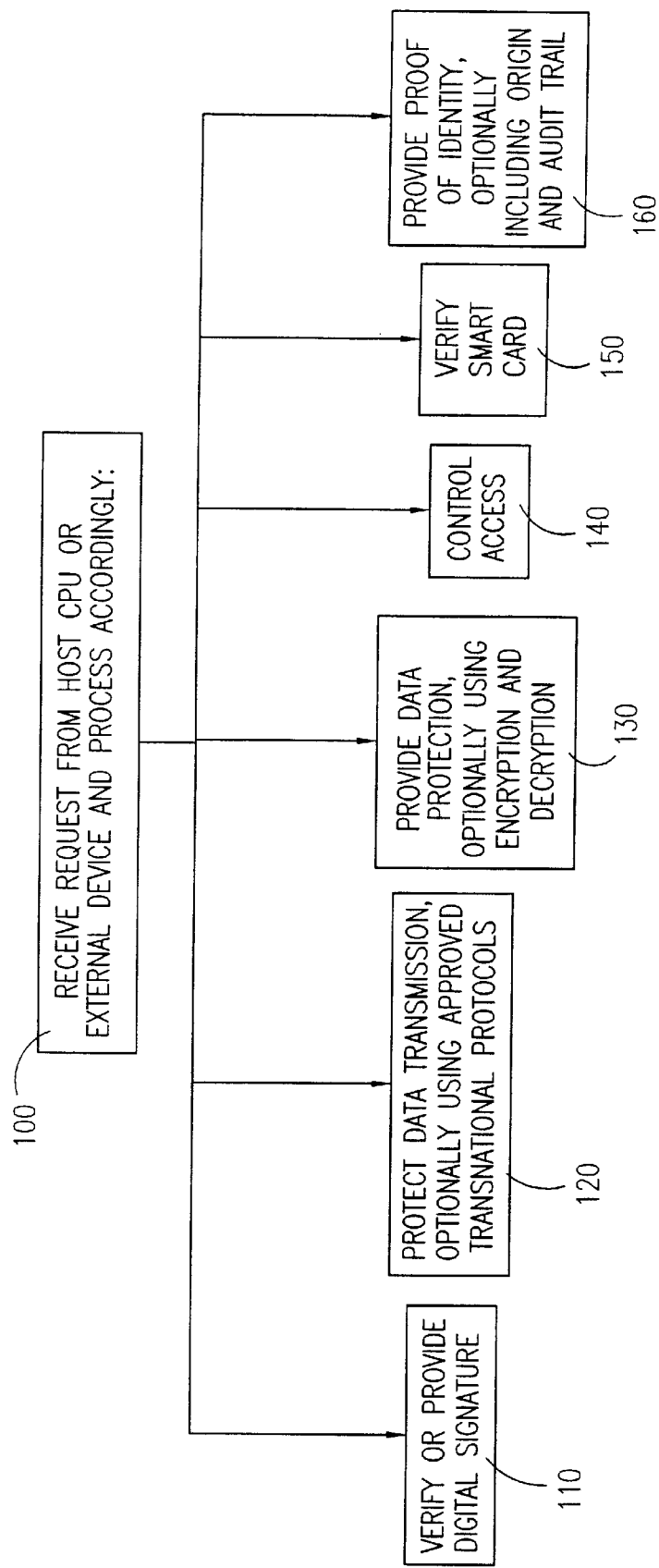
FIG. 3 is a simplified flowchart illustration of a preferred method of operation of the secure computer system 10 of FIG. 1.

Reference is now made to FIG. 3, which is a simplified flowchart illustration of a preferred method of operation of the secure computer system 10 of FIG. 1. The method of FIG. 3 preferably includes the following steps:

The authenticator computer 20 receives a request, either an internal request from the host CPU 30 or an external request from external device (step 100). The request is then processed according to the type of request.

If the request is to perform a digital signature operation, that is, to verify or provide a digital signature, as is well known in the art, the authenticator computer 20 performs the digital signature operation (step 110). Digital signature operations are described, for example, in R. L. Rivest, A. Shamir, and L. Adleman, referred to above. Typically, the request to provide a digital signature operation is received from the host CPU 30 and the result of the digital signature operation is output to the host CPU 30 for further processing.

If the request is to protect a data transmission, the authenticator computer 20 protects the data transmission (step 120). Typically, protection of a data transmission may include data encryption, data decryption and data verification, as is well known in the art. Protection of a data transmission may also include using an approved transnational protocol for protecting a data transmission, such as, for example, that described by C. Gressel, R. Granot, and I. Dror, referred to above. Other relevant apparatus and methods are also described in Israel patent applications 13375 and 15534 , and in U.S. patent application 08/437,223. Typically, the data to be protected is received from the host CPU 30 and the result of the data protection operation is output to the host CPU 30 for further processing.

Figure 4:
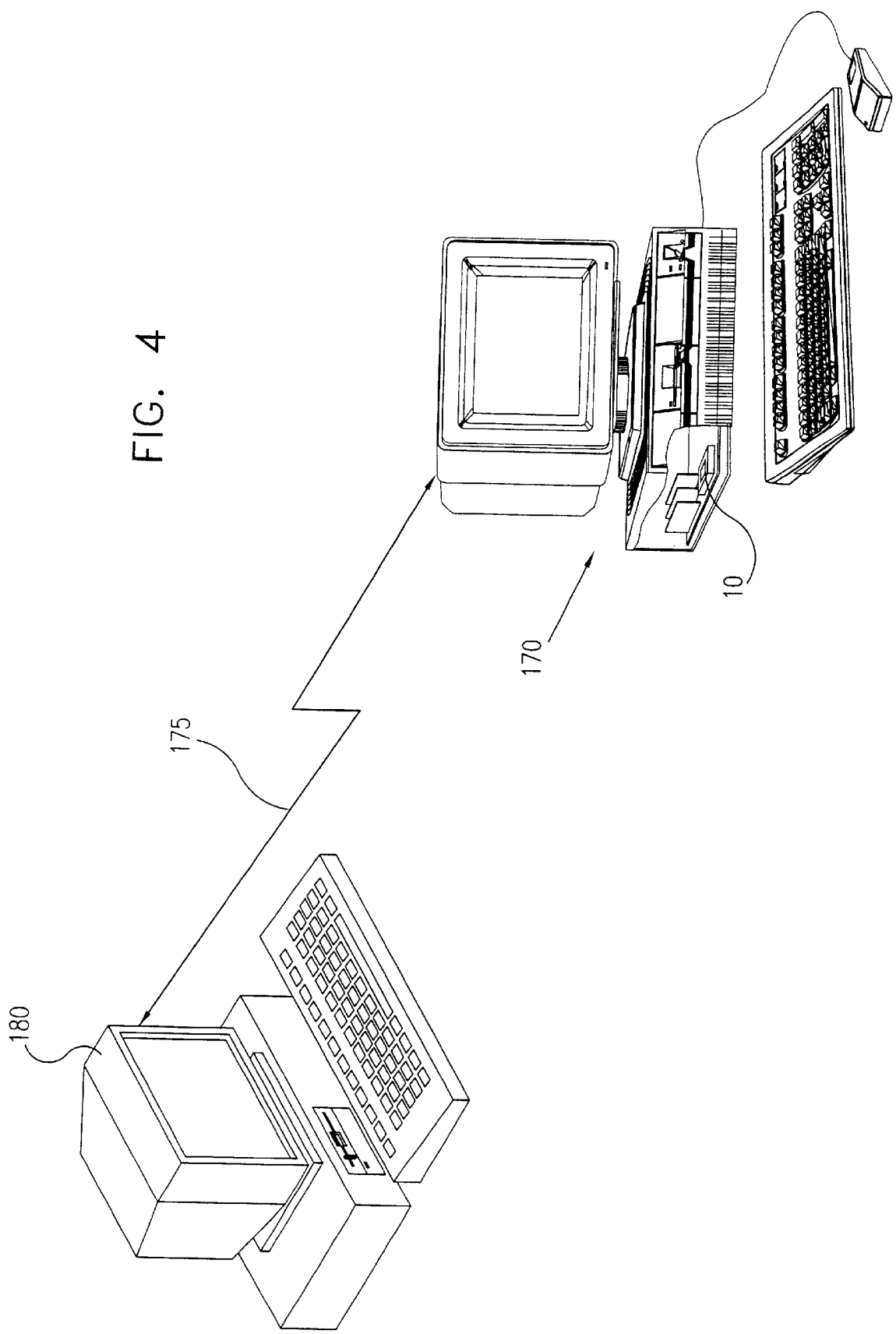
FIG. 4 is a simplified pictorial illustration of an alternative preferred embodiment of the present invention.

Reference is now additionally made to FIG. 4, which is a simplified pictorial illustration of an alternative preferred embodiment of the present invention. The embodiment of FIG. 4 is especially applicable for use with step 120 of FIG. 3. The system of FIG. 4 comprises a computer 170, the computer 170 comprising the secure computer system 10. The computer 170 is operative to transmit data over a remote data link 175 to a remote computer system 180. Protection of data transmission is provided by the secure computer system 10, as described above.

If the request is to provide data protection, such as, for example, to encrypt or decrypt data which is under control of the host CPU 30, the authenticator computer 20 provides the data protection (step 130). The data protection may comprise encryption of Modes of Operation, referred to above. Typically, the result of the data protection operation is output to the host CPU 30 for further processing.

If the request is to control access to an external device, the access control request is processed by the authenticator computer 20 (step 140). The external device may comprise any appropriate external device such as, for example, any of the following: A computerized device; a computer peripheral device; a locked door; or any other locked access apparatus. Processing of the access control request typically comprises receiving a request, typically from the host CPU 30 and verifying that the request is legitimate. Verifying that the request is legitimate may be performed using any appropriate method, such as a method well known in the art, for example the methods described R. L. Rivest, A. Shamir, and L. Adleman, referred to above.

If the request is to verify a smart card, the smart card is verified (step 150). Smart cards, as is well known in the art, may be used in a wide variety of ways, including the following: to store identifying information about an individual; to store personal or medical information about an individual; and/or to store financial information for use in carrying out transactions. Verifying the smart card may include verifying that the smart card is valid, as is well known in the art. Verifying the smart card may also include reading data from the smart card, as is well known in the art. Verifying the smart card may also include carrying out a financial transaction based on information stored in the smart card, as is well known in the art. Methods for verifying a smart card include those described in R. L. Rivest, A. Shamir and L. Adleman, referred to above.

Figure 5:
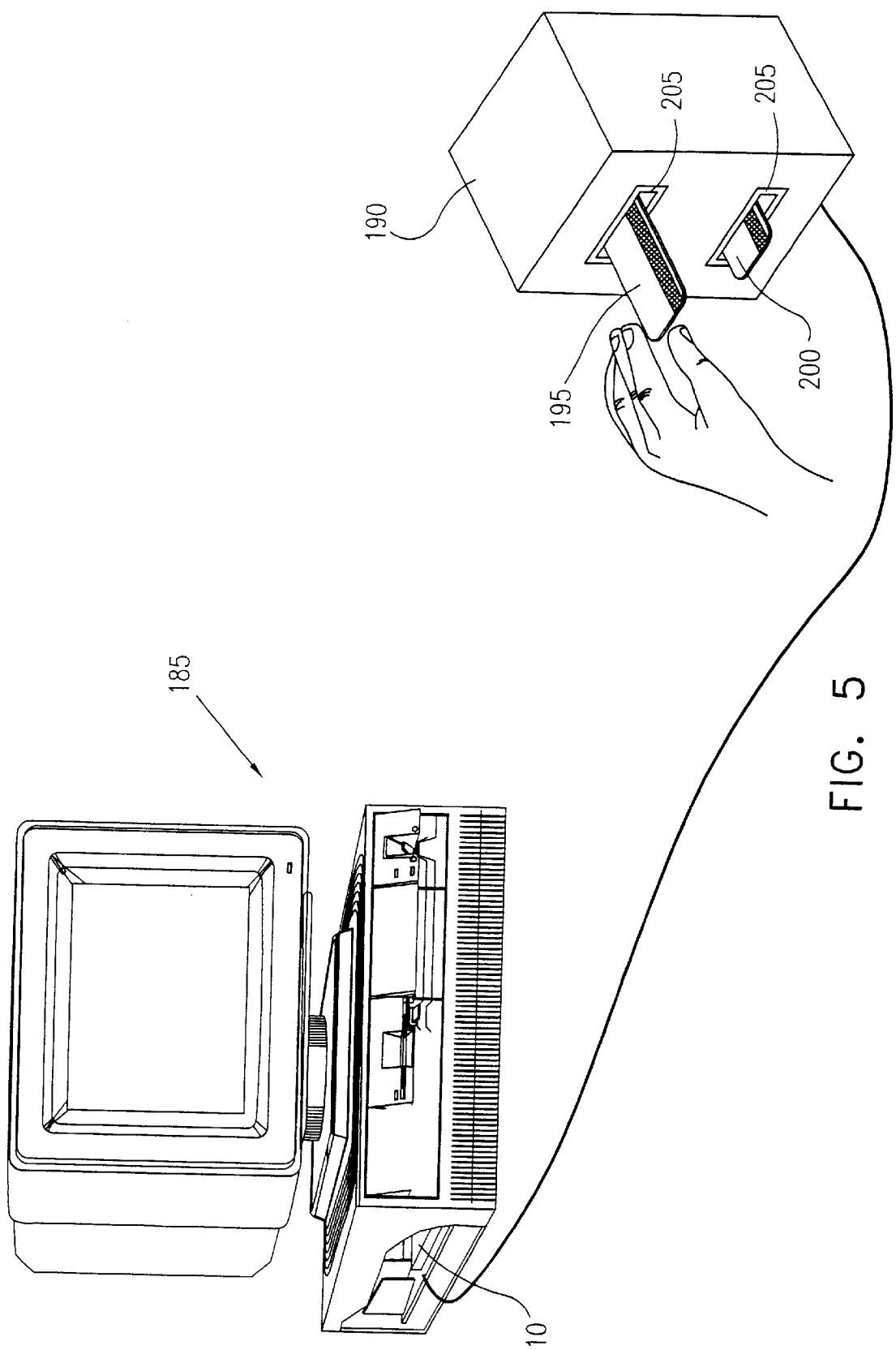
FIG. 5 is a simplified pictorial illustration of a further alternative preferred embodiment of the present invention.

Reference is now additionally made to FIG. 5, which is a simplified pictorial illustration of a further alternative preferred embodiment of the present invention. The system of FIG. 5 comprises a computer 185, the computer 185 comprising the secure computer system 10. The computer 185 is operatively attached to a smart card receiver 190. The smart card receiver 190 is operative to receive a first smart card 195 and, optionally, a second smart card 200 in one or more smart card acceptor sockets 205. It is appreciated that the smart card acceptor sockets 205 are adapted to accept the particular form of the smart cards 195 and 200 chosen for use, and that the card form is shown in FIG. 5 by way of example only.

When the second smart card 200 is used, the first smart card 195 typically represents customer information in a financial transaction, and the second smart card 200 typically represents merchant information or bank teller information in a financial transaction. The secure computer system 10 is operative to verify the first smart card 195 and, optionally, the second smart card 200, as described above. It is appreciated that by using both the first smart card 195 and the second smart card 2000 it is possible to record proof of a transaction both on the smart card belonging to the customer such as, for example, the first smart card 195 and on the smart card belonging to the bank such as, for example, the second smart card 200. The transaction proof typically comprises digital signatures of both the customer and the bank teller.

Processing of the smart card verification request typically comprises the authenticator computer 20 receiving a request, typically from the host CPU 30, and verifying that the request is legitimate, with output of the verification being sent to the host CPU 30.

If the request is to provide proof of identity, the authenticator computer 20 provides proof of identity (step 160).

Typically, proof of identity comprises proof of identity of the host CPU 30. By storing identity information identifying the host CPU 30, the authenticator computer 20 provides an identification function which may aid in preventing or deterring theft of the host CPU 30. Proof of identity may also comprise proof of identity of a user who requests access to certain protected files or data, in which case proof of identity establishes the user's access rights.

Reference is now additionally made to FIG. 6, which is a simplified pictorial illustration of a still further alternative preferred embodiment of the present invention, the system of FIG. 6 comprises the secure computer system 10. The system of FIG. 6 further comprises a verification unit 210, operatively attached to the secure computer system 10. The connection between the verification unit 210 and the secure computer system 10 is preferably a temporary connection which can be easily made and broken, and preferably comprises a connection to a minimum number of pins within the external connection 35 such as, for example, two pins. The connection between the verification unit 210 and the secure computer system 10 is preferably such that the connection may be made and broken whether or not the secure computer system 10 is installed in a computer.

The verification unit 210 is operative to send a signal to the secure computer system 10, preferably comprising an identification of the verification unit 210. The secure computer system 10 receives the signal and preferably verifies the signal, using verification methods well known in the art, to ensure that the verification unit of 210 is authorized to request proof of identity. If the verification unit 210 is so authorized, the secure computer system 10 provides the verification system 210 with proof of identity, which may be displayed by the verification unit 210, stored in the verification unit 210, and or output by the verification unit 210.

Proof of identity preferably comprises at least one of the following: serial number; origin, including at least one of manufacturer, date of production, place of production, and batch run of production; and information about a computer or other electronic product or other object in which the secure computer system 10 is used. It may also include public key certificates necessary for controlled use of licensed software. It is appreciated that proof of identity may comprise information relating to one or more of the following: the identity of the secure computer system 10; the identity of the authenticator computer 20; the identity of the host CPU 30; and the identity of the computer of other electronic product or other object in which the secure computer system 10 is used. Proof of identity may also include an audit trail typically comprising historical information concerning the manufacture and use of the secure computer system 10.

Figure 7:
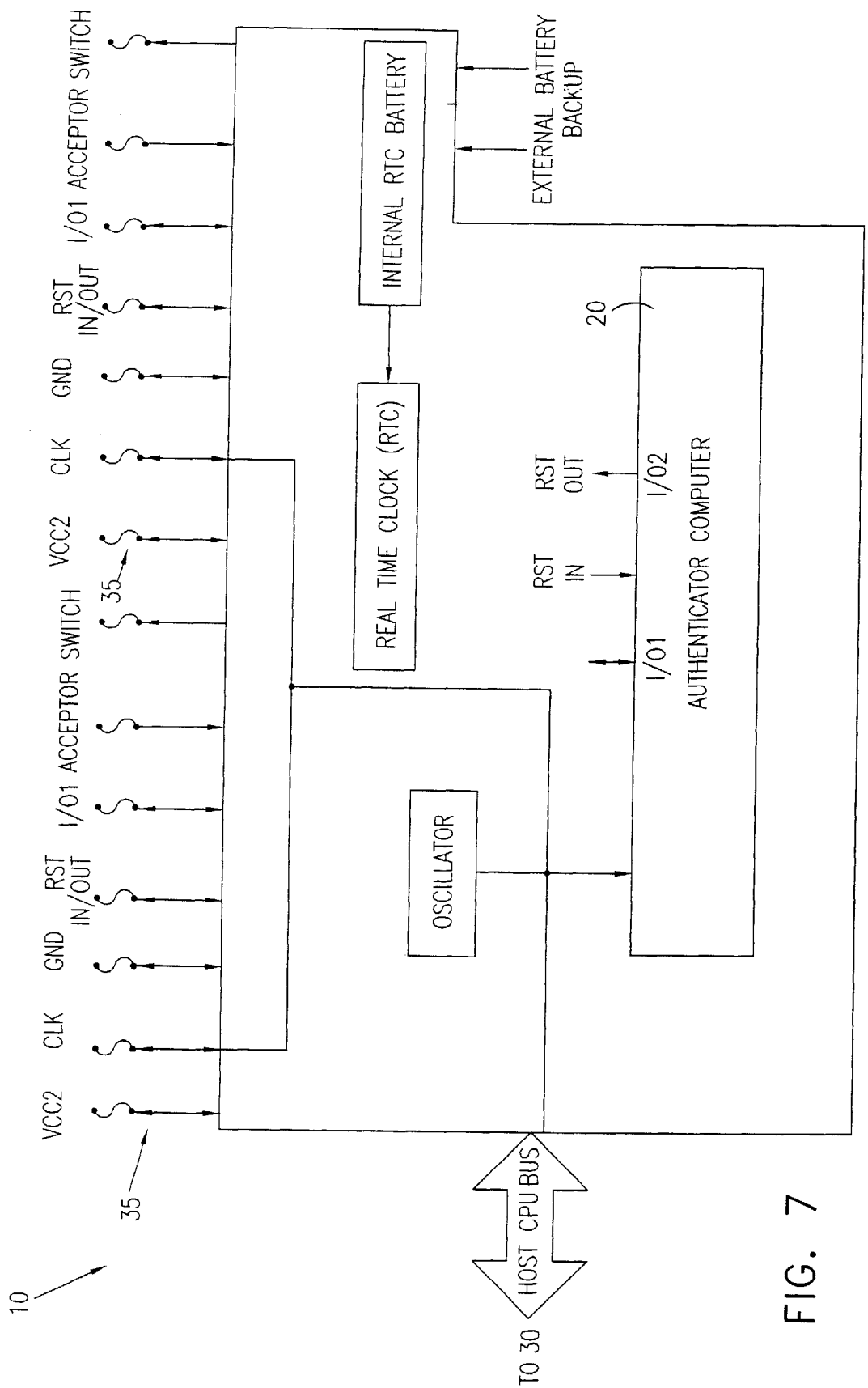
FIG. 7 is a simplified block diagram illustration of the secure computer system of FIG. 1.

Reference is now made to FIG. 7, which is a simplified block diagram illustration of the secure computer system 10 of FIG. 1. The system of FIG. 7 is self-explanatory, except as follows. The external connection 35 is preferably fused, to prevent application of an external over-voltage from damaging the authenticator computer 20 and thus removing the authenticator computer 20 from operation. Such damage might allow access without intervention by the authenticator computer 20 destroying the authenticator with the unique identity allowing the use of a stolen CPU.

It is appreciated that the software components of the present invention may, if desired, be implemented in ROM (read-only memory) form. Preferably, in the present invention a ROM would be electrically programmable and masked on during silicon fabrication. Preferably most of the program would be masked in the fabrication. Keys would be generated internally with the real random number generator and stored electronically programmable ROM and propriety program can be downloaded by a trusted third party using protocols as mentioned above. The software components may, generally, be implemented in hardware, if desired, using any conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable combination.

It will be appreciated by persons skilled in the art that the present invention is not limited to what has been particularly shown and described hereinabove. Rather, the scope of the present invention is defined only by the claims that follow:

What is claimed is:

1. A secure computer system comprising:

a host computer unit having embedded in a single package:

a host CPU; and an authenticating and security controlling computer;

a verification unit; and a smart card accepting connector providing a public-key protected communication channel between the authenticating and security controlling computer and the verification unit, in a first mode of operation of the secure computer system, and between the host CPU, via the authenticating and security controlling computer, and a smart card, via a smart card terminal, in a second mode of operation of the secure computer system;

wherein communication between the authenticating and security controlling computer and the smart card terminal is unmediated; and wherein the verification unit is operative to verify the identity of the authenticating and security controlling computer in said first move of operation.

2. A system according to claim 1, wherein the communication between the authenticating and security controlled computer and the smart card terminal is not mediated by intervening software units.

3. A method for securing a computer system comprising:

providing a host computer unit including embedding a host CPU and an authenticating and security controlling computer; in a single package;

providing a smart card accepting connector comprising a public-key protected communication channel between, in a first mode of operation of the computer system, the authenticating and security controlling computer and a verification unit, and between, in a second mode of operation of the computer system, the host CPU, via the authenticating and security controlling computer, and a smart card, via a smart card terminal;

wherein communicating between the authenticating and security controlling computer and the smart card terminal is unmediated; and wherein the verification unit is operative to verify the identify of the authenticating and security controlling computer in said first mode of operation.

\* \* \* \* \*